(12) United States Patent
Beard

(10) Patent No.: US 11,663,903 B2
(45) Date of Patent: May 30, 2023

(54) DRIVING WHILE SECURE

(71) Applicant: Tawana Beard, Mobile, AL (US)

(72) Inventor: Tawana Beard, Mobile, AL (US)

( * ) Notice: Subject to any disclaimer, the term of this patent is extended or adjusted under 35 U.S.C. 154(b) by 0 days.

(21) Appl. No.: 17/087,839

(22) Filed: Nov. 3, 2020

(65) Prior Publication Data

US 2022/0270471 A1    Aug. 25, 2022

(51) Int. Cl.
| | |
|---|---|
| *G08B 25/10* | (2006.01) |
| *H04W 4/029* | (2018.01) |
| *H04N 7/18* | (2006.01) |
| *G06V 20/56* | (2022.01) |

(52) U.S. Cl.
CPC ............. *G08B 25/10* (2013.01); *G06V 20/56* (2022.01); *H04N 7/185* (2013.01); *H04W 4/029* (2018.02)

(58) Field of Classification Search
CPC ... G08B 25/10; G06K 9/00791; H04W 4/029; H04N 7/185
See application file for complete search history.

(56) References Cited

U.S. PATENT DOCUMENTS

| | | | |
|---|---|---|---|
| 2015/0312400 A1* | 10/2015 | Hansen | G06K 9/00536 455/414.1 |
| 2016/0042767 A1* | 2/2016 | Araya | G11B 27/34 386/201 |
| 2016/0214535 A1* | 7/2016 | Penilla | B60L 53/305 |

* cited by examiner

*Primary Examiner* — James J Yang
(74) *Attorney, Agent, or Firm* — Ronald D. Baker; Baker & Co. Law Group

(57) ABSTRACT

The present invention is a system for submitting data which includes a data collecting computer comprising a processor and software. The processor is configured to connect to a communication system; submit audio and video data to a third party. The processor is configured to communicate, via the communication system, to a first communication device; and submit data to the first communication device for emergency purposes.

10 Claims, 5 Drawing Sheets of this patent document
contains material which is subject to trademark protection.
Trademarks are the property of their respective owners.

DRIVING WHILE SECURE

TRADEMARK NOTICE

A portion of the disclosure of this patent document contains material which is subject to trademark protection. Trademarks are the property of their respective owners.

BACKGROUND

Typically, when drivers are instructed to pull over by a law enforcement officer, emotions can be high. When emotions are combined with aggressive yet abusive actions by law enforcement things can generally go bad quickly between the driver and the officer. In recent years, the United States has seen a staggering number of incidents where minorities were disproportionately assaulted by law enforcement and in other high-profile cases were even murdered. News surrounding these events have frightened many U.S. families with no real solutions. In fact, young minority males appear to be the overwhelming victims for such crimes. Reports indicates that 31.8 percent of people shot by the police are African-American; this proportion is more than two and a half time the total population in which African-Americans represent. The data reveals that minorities are being killed disproportionately by police at an alarming margin. News involving such crimes perpetrated by law enforcement has resulted in tension in the streets during those times where minorities are pulled over by police.

The current invention will provide individuals a sense of security by being able to send information to critical contacts once things escalate. Once a person is pulled over, there isn't much time to make phone calls or in most cases ascertain as to why they are being pulled over. Often, upon immediately pulling over a driver, officers are trained to "control" the situation. This so called "control" can turn bad between the officer and the detained person for many reasons. These reasons can range from fear to anger due to heated conversations. The proposed invention gives individuals the option to activate a device for purposes of recording data and transmitting important information that will help protect the public against harassment, intimidation, brutality, and even death. The public is eager to welcome a method that would allow them to be prepared for such an event by being able to discreetly submit data during these unfortunate times.

BRIEF SUMMARY

The proposed invention will serve a broader use for mobile devices that incorporates the transmission of video and audio information for intervention and protection in order to prevent police harassment, intimidation, brutality, and death in a way that have not been previously utilized. The DWS can perform a host of emergency functions for a user to immediately send video and audio data when prompted to do so. By utilizing data attributable to a user's surrounding, mobile devices will help send critical data and help prevent harm to individuals who have been stopped by law enforcement. The collected data is transmitted to a DWS service provider who will monitor the incident to provide support to users of the DWS system. There have been a significant number of occurrences involving law enforcement where individuals have been either murdered, severely injured, or humiliated due to unethical behavior. The proposed invention will, solve a number of important issues when an individual is detained by contacting a third party that can offer some much-needed assistance during those times where an opportunity for brutality may occur.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 2:
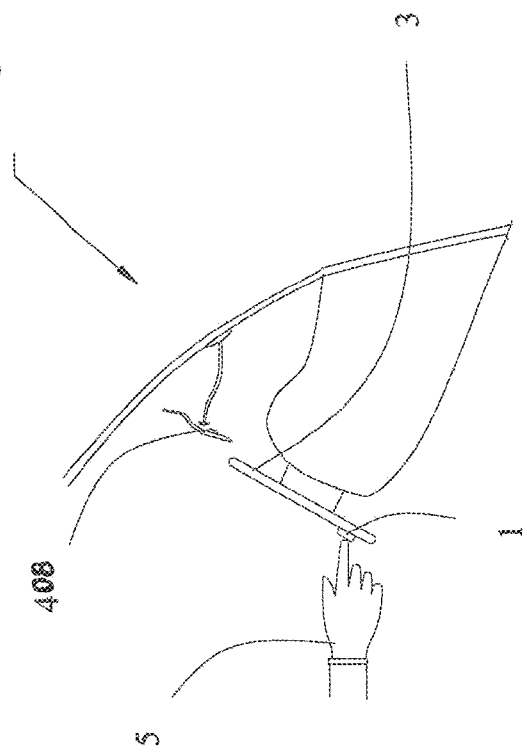
FIG. 2 is a side-view of an automobile compartment consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments and described. In the description below, like reference numerals are used to describe the same, similar or corresponding parts in the several views of the drawings.

The terms "a" or "an", as used herein, are defined as one or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a mobile device refers to a variety of components that operates using any means of internet connection or similar means for transmitting packets of data that allow smart devices (such as phones, badges, wearable devices, tablets, computers, handheld devices, game devices, etc.) to be updated when they receive data. The ability of a mobile device to collect such data packets based on a person's circumstances and environment is important when compiling critical information to relay to the end user.

Reference throughout this document to communication system refers to a variety of components and networks that operates the DWS system by using various communication devices to transmit data packets of audio and video that allow smart devices (such as phones, tablets, computers, handheld devices, game devices, etc.) to communicate with the DWS system for proper operation of the proposed invention.

Reference throughout this document to "DWS service provider", "service provider", "administrator" or similar terms refers to a network of security personnel that is contacted by the user via the DWS system to provide assistance during those times when the user feels threatened by a law enforcement official. The DWS service provider will receive the audio and video data and make necessary determination whether the user will need immediate assistance based on the circumstances.

Reference throughout this document to first communication device refers to a variety of services and devices that a user would communicate with utilizing the mobile device to operate the DWS system (such as 911 dispatch; Bluetooth devices, Cloud servers etc.) for proper operation of the proposed invention.

Reference throughout this document to window seal refers to a sticker that will be displayed by a user to advertise that the DWS system is in use upon being pulled over by an officer. The seal can be applied virtually anywhere on the vehicle to inform an officer that he is being monitored by DWS.

The DWS application utilizes a portable device (1) or similarly known transmission method for communicating data in the form of photos, videos, and audio to a BLE-connected mobile device (408) which in turn will transmit data to the DWS service provider via the DWS system. A data collecting computer will act as the system's central control unit by utilizing a processor and software to collect and integrate data for the proper operation of the overall communication system. The service provider or similar administrator can use the data-collecting computer to control the overall system and flow of data once the system communicates with the data collecting computer. Once the data collecting computer receives the transmission, the data collecting computer can automatically control the DWS system and allow the service provider to monitor and send necessary data to additional contacts and maintain the overall operation of the DWS system. As an example, the mobile device (408) is in constant contact with the DWS application software system at all times; users may alert the DWS system in the event they feel that they are in danger due to a traffic stop. It is important to note that the present invention can be activated by the user (3) pressing a portable device (1) installed in a convenient location, preferably on a steering wheel (3) by way on of an attachment apparatus (2) in a vehicle thus transmitting information simultaneously to DWS system via mobile device (408) and activate an audible alert that informs those present that the DWS is recording all video footage. In a non-limiting example, the installed software system will activate and transmit data when prompted. This service is critical where a user (3) has been alerted to a potential situation for danger and emergency assistance is needed. Once the user activates the portable device, a video surveillance-device (9) conveniently located along the exterior of the vehicle will start recording movement around the exterior area of the vehicle. Simultaneously, an audio System (10), preferably attached to the exterior mirrors (6), will alert all who are present that they are being monitored by the DWS system. Once the system is initiated the DWS system will be alerted by the embodiment and all of the data in an instance will be transmitted for emergency purposes. The data maybe saved to a cloud-based service (314) or similar means such as Microsoft cloud service for historical purposes. Any mobile device (408) that the user decides to configure will have the capability to collect and transmit data. Information is constantly compiled for each device through use of the software application (518) on the desired mobile device (408).

Utilizing such data as audio, videos etc. provides highly accurate date for mobile device users (404) to record dangerous encounters. The more data collected from the surrounding conditions the more information will be transmitted to the DWS system. In an exemplary embodiment the use of audio data and videos can be simultaneously transmitted to a first communication device (416) for purposes of communicating with the DWS system once activated by the user. As a non-limiting example where data is readily available, the software system maybe used to collect critical data for useful evidence. To illustrate, critical details encountered by the user maybe collected and data such as audio information will be recorded by DWS system as an historical account of events. The DWS system can also submit data to a cloud-based service (414) such as Microsoft, Facebook, LinkedIn, Amazon, and other such service providers, may receive data regarding the user's shared experiences.

In an additional embodiment, the DWS application may also be configured as a portable device (1) for physically challenged individuals to use without much difficulty. For instance, the portable device (1) may be worn or stored in a convenient location within the vehicle to allow elderly individuals to send necessary data to a first communication device (416). A portable device (1) provides increased options to utilize which helps the user better activate the unit under stressful conditions.

Figure 1:
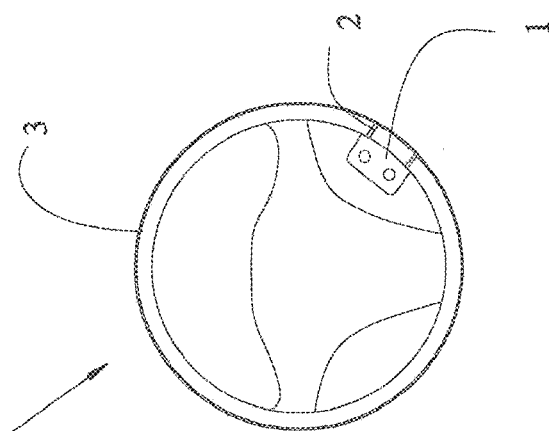
FIG. 1 is a perspective view of a vehicle steering wheel consistent with certain embodiments of the present invention.

Turning now to FIG. 1, this figure presents a perspective view of a vehicle steering wheel (3) for an exemplary configuration consistent with certain embodiments of the present invention. The portable DWS device (1) can be adjoined to a standard steering wheel (3) by attachment apparatus (2).

Turning now to FIG. 2, this figure presents a side view of an automobile compartment of depicting a user's band positioned in a fashion to activate the DWS portable system via the portable device (1) attached to the steering wheel (3) for an exemplary configuration consistent with certain embodiments of the present invention. The schematic also includes a mobile device (408) that is useful for communicating with the portable device (1). The software application (518) may be downloaded to the mobile device (408) to allow data to be transmitted to the DWS system.

Figure 3:
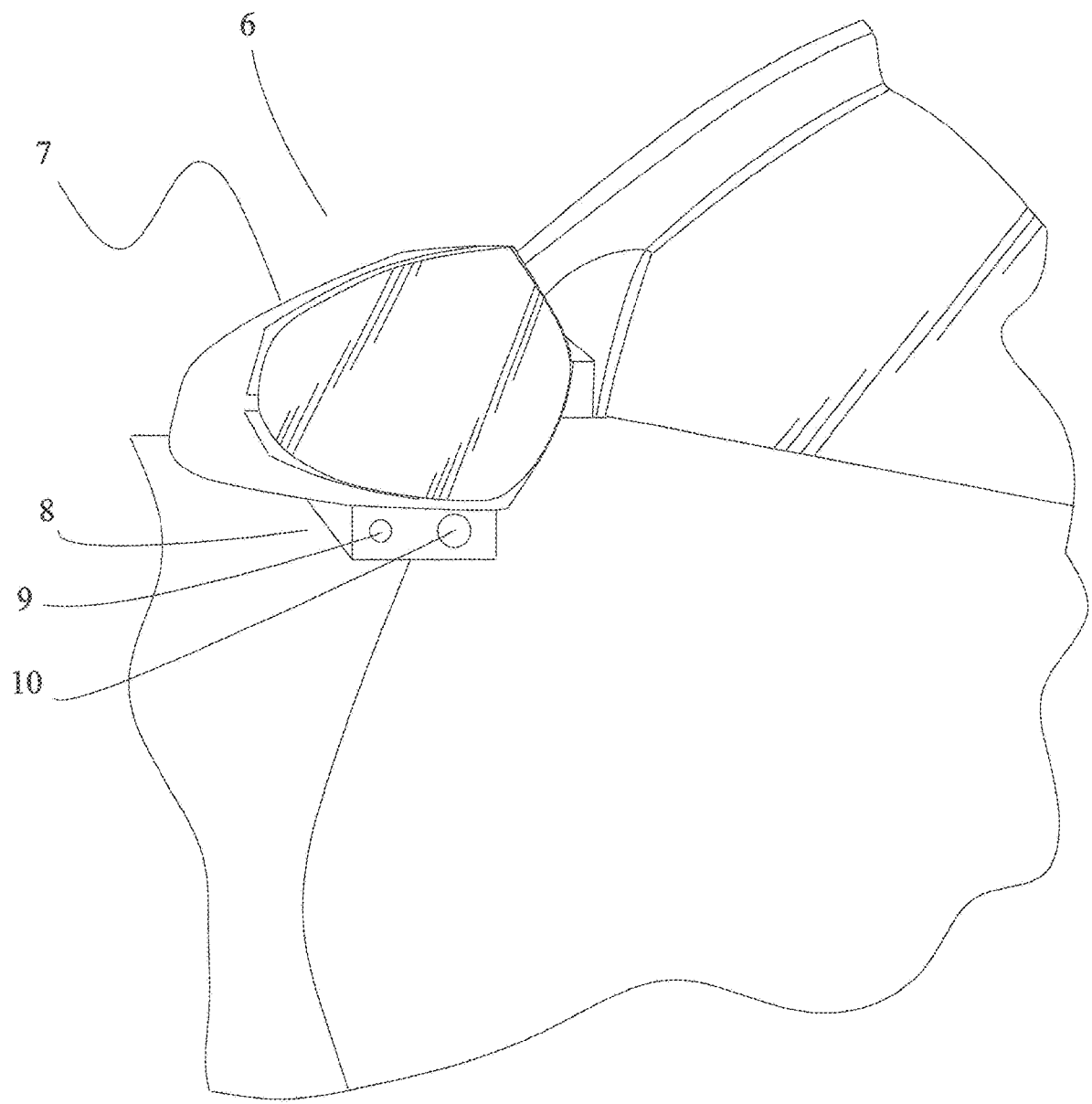
FIG. 3 is a schematic of an external vehicle mirror consistent with certain embodiments of the present invention.

Turning now to FIG. 3, this figure presents a exterior side view mirror (6) of an automobile that further depicts an attachment (8) along the bottom edge of the mirror exterior (7). The figure also depicts the camera (9) and speaker (10) attached to the attachment (8) for an exemplary configuration consistent with certain embodiments of the present invention.

Figure 4:
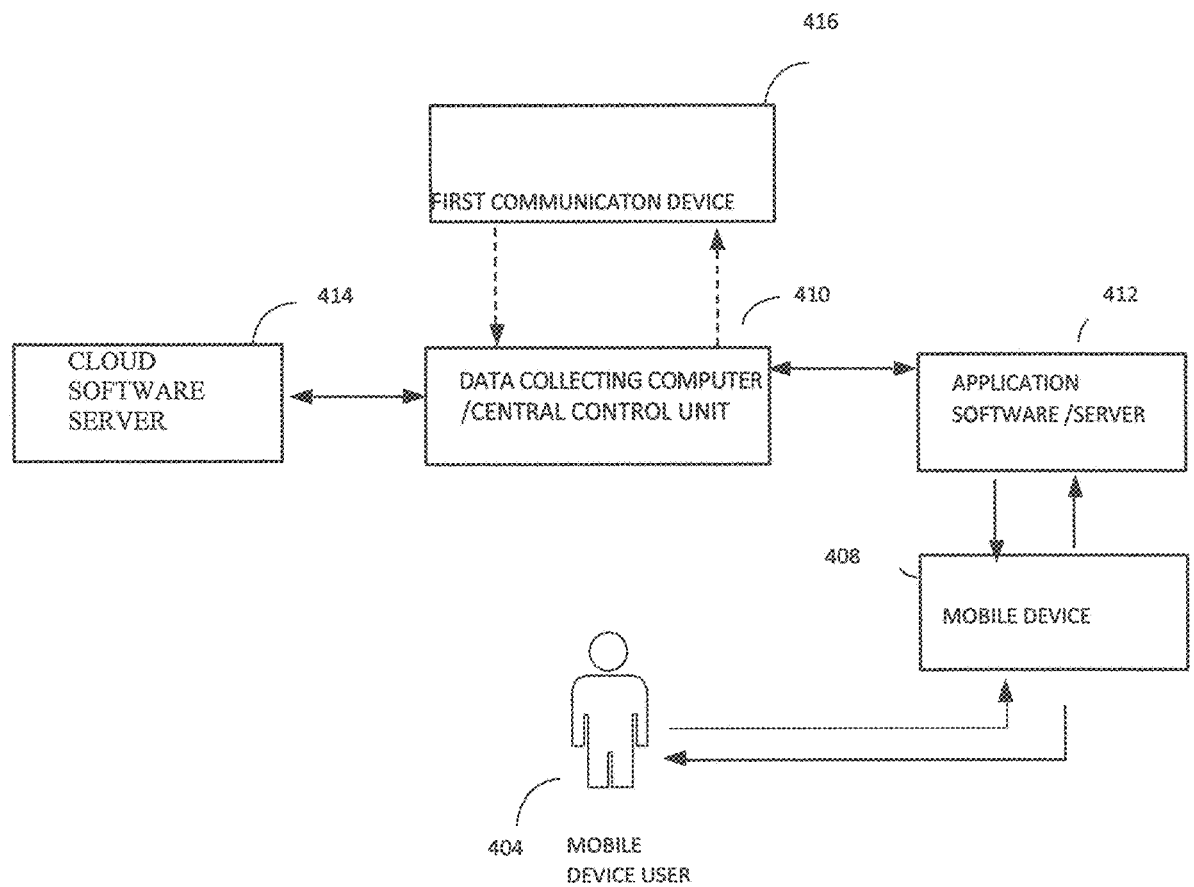
FIG. 4 is a system diagram for an exemplary system configuration consistent with certain embodiments of the present invention.

Turning now to FIG. 4, this figure presents a system diagram for an exemplary system configuration consistent with certain embodiments of the present invention. A system for transmitting collected data (400). A mobile device (408) may be activated by the user via the portable device within a certain location where information may be initially transmitted to a cloud-based server (414) for use by a mobile device (408). A user (404) may initiate the portable device (408). When the system is initiated, the mobile device (408) sends information data to the application software server (412) through one or more cloud servers (414). The application, software server (412) stores the transmitted information data in a data collecting computer (410) which is submitted to a first communication device (416).

Figure 5:
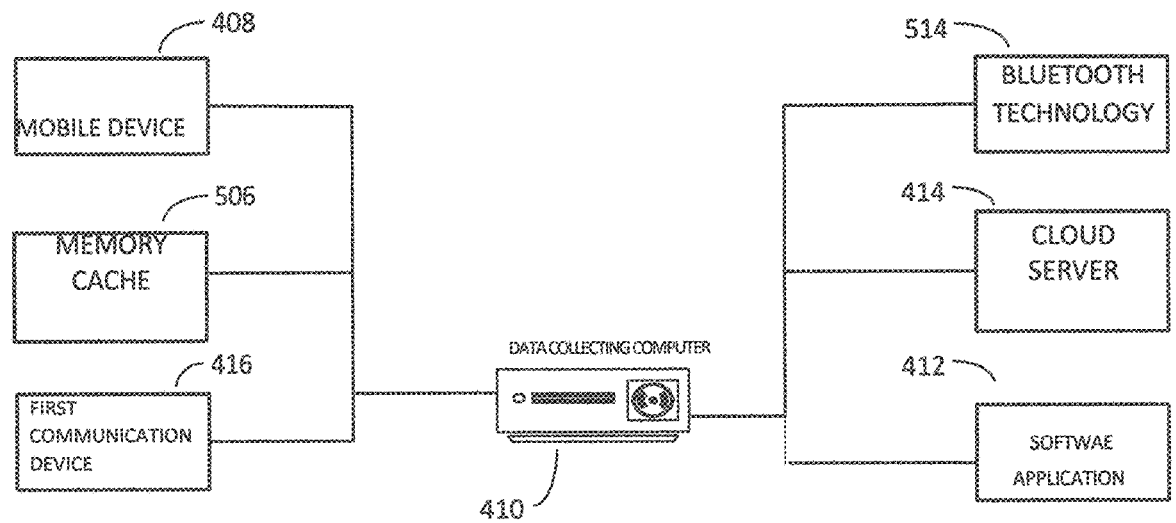
FIG. 5 is a system diagram for initiating the DWS system consistent with certain embodiments of the present invention.

Turning to FIG. 5, this figure presents a system diagram for an exemplary system configuration consistent with certain embodiments of the present invention. This figure presents a diagram for how a mobile device (408) captures data and stores memory in a cache (506) which continuously collects data from the user's location. The collected data is submitted to a memory cache (506) and is maintained by the server (414). The memory cache (506) is an active component of a data collecting computer (410) that communicates with the first communication device (416) that is in possession of a designated contact. Each mobile device (408) may have multiple applications installed on the device (408) based upon preferences. the installed software application (412) to each mobile device (408) is connected to the data collecting computer (410) for purposes of transmitting vital information to the first communication device (416). The applications (412) do not have to be active for the server (414) to retrieve data, but the portable device must be operational and manually initiated by the user in order to collect data such as video. The system may retrieve the information for the user and transmit the collected data for the mobile device (408), and transmitted to the DWS service provider.

Figure 6:
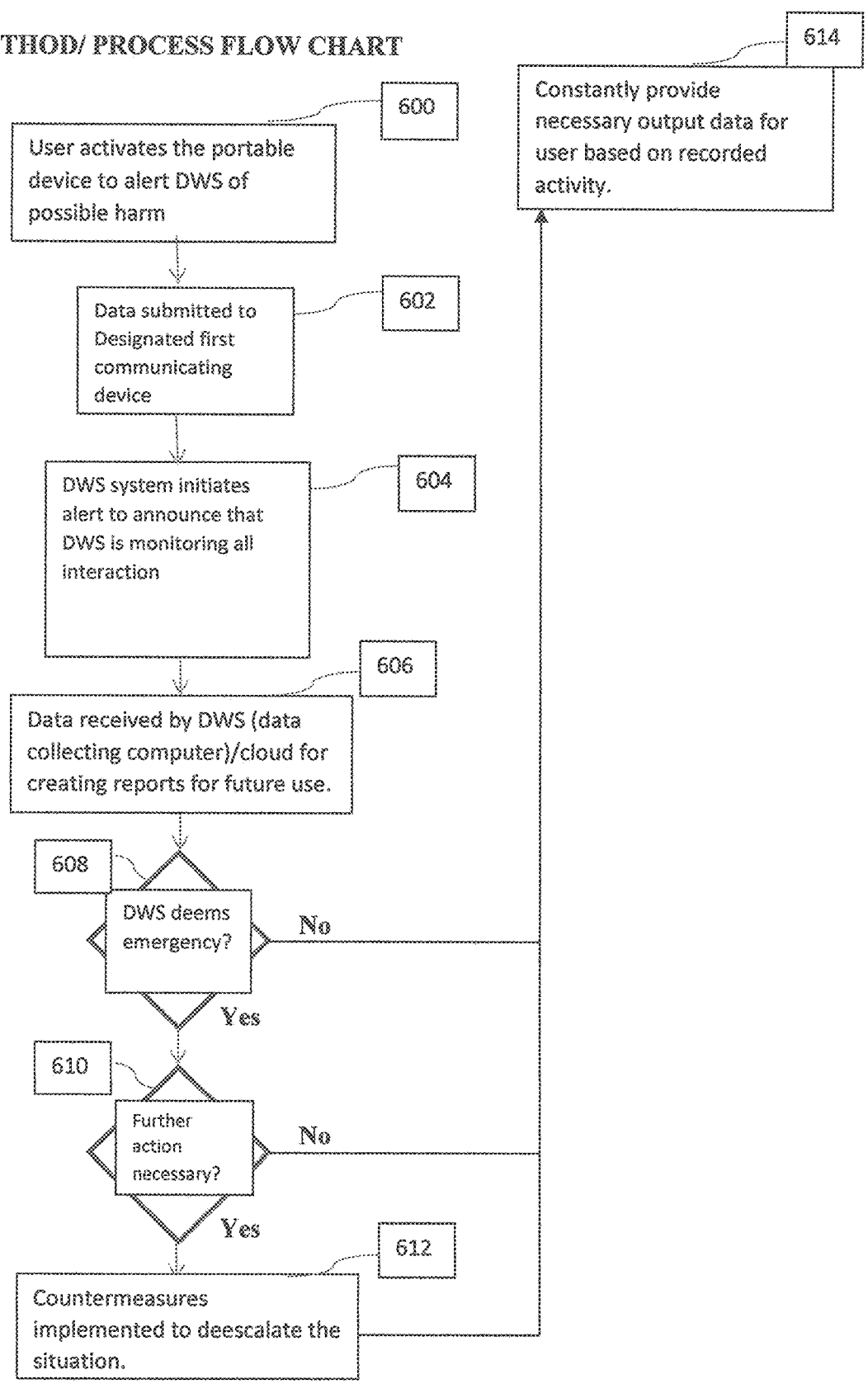
FIG. 6 is a process flow for the determination of critical data for the owner or user consistent with certain embodiments of the present invention.

Turning to FIG. 6, this figure presents a process flow forth the DWS system consistent with certain embodiments the present invention.

At (600) the user activates the portable device to send collected data to a software application managed by DWS.

At (602), upon a user's selection, the data will be submitted to a first communication device for notification and data analysis. In the event the user does not manually submit the data to the service provider, the DWS system will automatically submit data.

At (604), once the system is activated, the DWS system will make an audible announcement that the DWS is monitoring interaction between the officers and the user.

At (606), the DWS system has the capacity to formulate critical data by utilizing all of the collected information from the portable device.

At 608, the DWS system receives a notification from the software application at which point the installed application allows the DWS system to be alerted of the transmitted information, if the information is not properly transmitted to the service provider, then the system will initiate an output data loop thus prompting another transmission to the DWS system until the information is fully transmitted.

At. (610), the DWS system allows the user to take advantage of several options to ensure that the service provider is not only receiving critical data but also improving other pertinent data through information collected through previous activities by the user.

At (612), upon a user's request the DWS system offers enhancements that include three different versions for the user that allows for increased tools and options for the vigilant user who wish to stay abreast of critical news and other social media events for example.

While certain illustrative embodiments have been described, it is evident that many alternatives, modifications; permutations and variations will become apparent to those skilled in the art in light of the foregoing description.

What is claimed is:

1. A system for use with a vehicle for providing a mobile device user with emergency data during a traffic stop comprising:
    a portable device to generate an emergency signal when the mobile device user presses the portable device;
    a video surveillance device triggered by the portable device to capture video data comprising movement around an exterior area of the vehicle;
    a mobile device to wirelessly receive the emergency signal from the portable device and the video data from the video surveillance device;
    a data collecting computer communicatively coupled to the mobile device to receive the emergency signal and video data over a network, wherein the data collecting computer comprising:
        a processor; and
        a memory communicatively coupled to the processor, the memory having stored therein computer-executable instructions that when executed by the processor, cause the processor to:
            establish a communication with a first communication device of a designated contact;
            submit data to the first communication device;
            process the video data and the emergency signal indicative of a location of the vehicle, and a time-stamp to formulate emergency data;
            communicate, via a communication system, the emergency data to the portable device; and
            initiate, via the communication system, an output data loop to prompt another transmission related to the emergency data to the portable device; and
    an audio device triggered by the data collecting computer to generate an audible signal indicative of monitoring an interaction between one or more persons and the mobile device user in real-time, wherein the mobile device comprises a software application connected to the data collecting computer to transmit information to the first communication device, wherein if the information is not transmitted to a service provider, then the system initiates an output data loop thus prompting another transmission to the system until the information is transmitted.

2. The system as claimed in claim 1 comprises a cloud based service to store the video data, the emergency signal, and the audible signal.

3. The system as claimed in claim 1, wherein the video surveillance device is placed along an exterior surface of the vehicle.

4. The system as claimed in claim 1, wherein the audio device is attached to an exterior mirror assembly of the vehicle.

5. The system as claimed in claim 1, wherein the portable device is affixed to a steering wheel of the vehicle.

6. The system as claimed in claim 1, wherein the portable device is a wearable device.

7. The system as claimed in claim 1, wherein the command gesture comprising a push gesture and a touch gesture.

8. The system as claimed in claim 1, wherein the data collecting computer acts as a central control unit.

9. The system as claimed in claim 1, wherein the data collecting computer submits the video data to the first communication device for notification and data analysis upon a selection of the mobile device user.

10. The system as claimed in claim 1, wherein the mobile device transmits the video data to the data collecting computer if the user does not manually submit the video data within a predefined duration.

\* \* \* \* \*